(12) United States Patent  (10) Patent No.: US 7,826,125 B2
Psaltis et al.  (45) Date of Patent: Nov. 2, 2010

(54) LIGHT CONDUCTIVE CONTROLLED SHAPE DROPLET DISPLAY DEVICE

(75) Inventors: Demetri Psaltis, Padsadena, CA (US); Allen Pu, San Gabriel, CA (US)

(73) Assignee: California Institute of Technology, Pasadena, CA (US)

( * ) Notice: Subject to any disclaimer, the term of this patent is extended or adjusted under 35 U.S.C. 154(b) by 1146 days.

(21) Appl. No.: 11/451,055

(22) Filed: Jun. 12, 2006

(65) Prior Publication Data

US 2007/0002413 A1  Jan. 4, 2007

Related U.S. Application Data

(60) Provisional application No. 60/690,202, filed on Jun. 14, 2005.

(51) Int. Cl.
 *G02B 26/00* (2006.01)
(52) U.S. Cl. ...................................... 359/290; 359/291
(58) Field of Classification Search .................. 359/290, 359/291
 See application file for complete search history.

(56) References Cited

U.S. PATENT DOCUMENTS

| | | | |
|---|---|---|---|
| 5,956,005 A | 9/1999 | Sheridon | |
| 6,262,706 B1 | 7/2001 | Albert et al. | |
| 6,369,954 B1 | 4/2002 | Berge et al. | |
| 6,449,081 B1 | 9/2002 | Onuki et al. | |
| 6,473,492 B2 | 10/2002 | Prins et al. | |
| 6,603,444 B1 | 8/2003 | Kawanami et al. | |
| 6,700,556 B2 | 3/2004 | Richley et al. | |
| 6,702,483 B2 | 3/2004 | Tsuboi et al. | |
| 6,844,953 B2 | 1/2005 | Reboa | |
| 2004/0160684 A1 | 8/2004 | Prins et al. | |
| 2004/0196525 A1 | 10/2004 | Fujii et al. | |
| 2005/0113912 A1* | 5/2005 | Feenstra et al. | 623/6.13 |
| 2008/0297880 A1* | 12/2008 | Steckl et al. | 359/291 |

OTHER PUBLICATIONS

H. Moon, S.K. Cho, R.L. Garrell, C.J. Kim, "Low Voltage Electrowetting-on-Dielectric", Journal of Applied Physics, vol. 92, No. 7, Oct. 1, 2002, pp. 4080-4087.

M.G. Pollack, A.D. Shenderov, R.B. Fair, "Electrowetting-Based Actuation of Droplets for Integrated Microfluidics", Lab. Chip, vol. 2, 2002, pp. 96-101.

(Continued)

*Primary Examiner* — Jordan M. Schwartz
*Assistant Examiner* — James C Jones
(74) *Attorney, Agent, or Firm* — Greer, Burns & Crain Ltd.

(57) ABSTRACT

A light conductive controlled shape droplet display device of the invention includes a light source. A light conductive substrate receives and conducts light from the light source. A cover disposed relative to the substrate, conducts light received from the substrate out and away from the display device. Pixels in the display are defined by fluid droplets in optical communication with the substrate and the cover. Hydrophobic layers associated with the substrate and the cover control the shape of the fluid droplet in conjunction with properties of the fluid droplet. Persistent displays are possible, as are displays that require periodic refresh to maintain the display. Electrodes modulate the amount of light conducted by the fluid droplets from the substrate into the cover. In preferred embodiments, each pixel includes subpixels formed by different primary colored fluid droplets.

15 Claims, 6 Drawing Sheets

OTHER PUBLICATIONS

M.G. Pollack, R.B. Fair, A.D. Shenderov, "Electrowetting- Based Actuation of Liquid Droplets for Microfluidic Applications", Applied Physics Letters, vol. 77, No. 11, Sep. 11, 2000, pp. 1725-1726.

J. Heikenfeld, A.J. Steckl, "Demonstration of Fluorescent RGB Electrowetting Devices for Light Wave Coupling Displays", EL, 2004, pp. 1-4.

J.C. Heikenfeld, A.J. Steckl, "Liquid Light", Information Display, Nov. 2004, pp. 26-31.

M.A. Mossman, D.S. Arney, R.W. Biernath, R.J.N. Coope, A. Kotlicki, M.J. Pellerite, J.E. Potts, S.P. Rao, L.A. Whitehead, "New Reflective Display Based on Total Internal Reflection in Prismatic Microstructures", Physics, 2000, pp. 311-314.

"Digital Microfluidics", Duke University, Durham, N.C., Jun. 2004.

"A Reflective display based on Electrowetting", ID 696680, IP.com Prior Art Database.

\* cited by examiner

LIGHT CONDUCTIVE CONTROLLED SHAPE DROPLET DISPLAY DEVICE

PRIORITY CLAIM AND REFERENCE TO RELATED APPLICATION

This application is related to and claims priority under 35 U.S.C. §119 from prior provisional application Ser. No. 60/690,202, which was filed Jun. 14, 2005.

FIELD

A field of the invention is displays. The invention provides a general purpose display device that is suitable for both large and small displays, such as those required by televisions, computer monitors, handsets, medical devices, etc.

BACKGROUND

Demand for flat panel displays is driven by a number of markets, including small and large consumer electronics applications, military applications, medical applications, handheld device applications, etc. Flat panel display sales have surged. The flat panel display market in 2004 was estimated by some to be a $62.2 billion market. Some expect this market to grow past $100 billion in a few years. In 2004, liquid crystal digital (LCD) displays accounted for about 78% of the $62.2B market.

Flat panel displays have obvious aesthetic and physical advantages compared to tube displays. Additionally, the picture quality in flat panel displays, e.g., plasma and liquid crystal digital displays has increased since the introduction of these technologies. Ongoing improvements in resolution and picture quality are being made, while the cost of flat panel displays continues to decrease.

In an LCD display, the positioning of a liquid crystal molecule column affects the polarization of light in a pixel. Each pixel in a display typically includes three sub-pixels. Each sub sub-pixel typically has one of three primary color filters (red, green or blue) and a black matrix. The display is backlit by a light source. Top and bottom polarizers are intended to block light when a sub pixel is "off", and pass light to various degrees through the color filter when the electronics position the liquid crystal to polarize the backlight and permit it to pass through the color filter.

The LCD display model, while generally favored for low power, has some inherent drawbacks. The model relies upon two polarizer layers, which block a significant amount of light produced by the backlight. In the process of polarizing the light, the polarizer layer closest to the backlight blocks at least 50% of the light. Therefore, a large amount of electrical power is wasted to boost the light output from the backlight in order to produce a bright display. In portable electronics, e.g., laptop computers, personal digital assistants, and handsets, reducing the power consumption of the display remains important. The display, often an LCD display, remains the biggest single power draw in a typical portable electronic device.

Contrast, brightness and viewing angles are also issues in LCD displays. The relative lack of contrast and lack of brightness in LCD displays is attributable to the polarizer layers required by LCD displays. When a particular colored sub pixel is "on", the polarizer layers permit the light to pass through the color filter and be emitted from the display, but the polarization filters portions of the available light and therefore substantially reduces the brightness of the light passing through. On the other hand, when a particular color sub pixel is "off", the polarizer layers are intended to black the backlight, but effectively dim it to a great extent. An amount of light can be perceived as passing through the sub-pixel, reducing both the black levels and contrast ratios achievable with the LCD.

Recently, Philips has been researching and prototyping a different type of display, based upon the electrowetting principle. In the Philips prototype displays, electrowetting is used to move a colored oil layer away from a white background. The oil covers a hydrophobic layer, separating it from a water layer on top. Interaction of the oil, water, and the hydrophobic layer is controlled by an electric field. Application of an electric field across the layers causes water to contact the hydrophobic layer, displacing the oil, and the colored pixel is replaced by a white background.

Electrowetting is being researched by Philips and others, and various electrowetting display models have been published. U.S. Pat. No. 6,700,556, to Richley et al., entitled Display Sheet with Stacked Electrode Structure, discloses a display having alternating conducting and non-conducting sheets with fluid reservoirs. The reservoirs communicate with each other through apertures. Applying a field across selected apertures causes liquid to be pumped from one reservoir into the other, altering or producing a display based upon the position of the liquid. U.S. Pat. No. 5,956,005 to Sheridon, entitled Electrocapillary Display Sheet Which Utilizes an Applied Electric Field to Move a Liquid Inside the Display Sheet, also uses fluid movement between reservoirs for display effects.

U.S. Pat. No. 6,034,444 to Kawanami et. al., entitled Display Element and Display Device Having It, makes use of electronic control of liquid to focus or defocus light toward holes in a mask layer. In the '444 patent, first and second liquids are confined in a space between substrates. One of the liquids interacts with a patterned surface treatment layer. Under control of an electric field, the first liquid is controlled to have its contact angle with the patterned surface treatment layer changed. Light passing through the liquid is focused or not focused toward a corresponding small hole in the mask layer depending upon the contact angle of the first liquid.

U.S. Published application 2004/0196525 to Fujii et al, entitled Display Device discloses the use of fluid to either color or block light to produce a display. In the '525 application, a droplet of a coloring liquid is sealed in a cavity and controlled with an electric field to color or block light.

SUMMARY OF THE INVENTION

A light conductive controlled shape droplet display device of the invention includes a light source. A light conductive substrate receives and conducts light from the light source. A cover disposed relative to the substrate, conducts light received from the substrate out and away from the display device. Pixels in the display are defined by fluid droplets in optical communication with the substrate and the cover. Hydrophobic layers associated with the substrate and the cover control the shape of the fluid droplet in conjunction with properties of the fluid droplet. Persistent displays are possible, as are displays that require periodic refresh to maintain the display. Electrodes modulate the amount of light conducted by the fluid droplets from the substrate into the cover. In preferred embodiments, each pixel includes sub-pixels formed by different primary colored fluid droplets.

DETAILED DESCRIPTION OF THE PREFERRED EMBODIMENTS

The invention provides a display device. A display device of the invention produces displays by controlling the shape and, in some embodiments the position, of fluid droplets using the electrowetting effect. The display includes an array of pixels, each having, for example, three sub pixels. In an individual pixel or sub pixel, a fluid droplet serves as an electrically controlled waveguide between a light guiding substrate and a display cover. The shape/position of the fluid droplet is controlled its fluid properties, by hydrophobic properties of layers that it contacts, and applied voltage. In preferred embodiments, the amount of light conducted through the fluid droplet depends on the shape of the fluid, permitting use of the shape to achieve a full range of light modulation in the pixel(s) or sub-pixel(s). In other embodiments, droplet position is used in addition to droplet shape to achieve a full range of light modulation.

A preferred embodiment light conductive controlled shape droplet display device of the invention includes a light source. A light conductive substrate receives and conducts light from the light source. A cover disposed relative to the substrate conducts light received from the substrate out and away from the display device. Pixels in the display are defined by fluid droplets in optical communication with the substrate and the cover. Hydrophobic layers associated with the substrate and the cover control the shape of the fluid droplet in conjunction with properties of the fluid droplet. Persistent displays are possible, as are displays that require periodic refresh to maintain the display. Electrodes modulate the amount of light conducted by the fluid droplets from the substrate into the cover. In preferred embodiments, each pixel includes subpixels formed by different primary colored fluid droplets.

Preferred embodiments will now be discussed with reference to the figures. Schematic illustrations will be fully understood by artisans. Artisans will also appreciate and understand that devices are not illustrated to scale, and features may be exaggerated for purposes of illustrating the invention.

Figure 1:
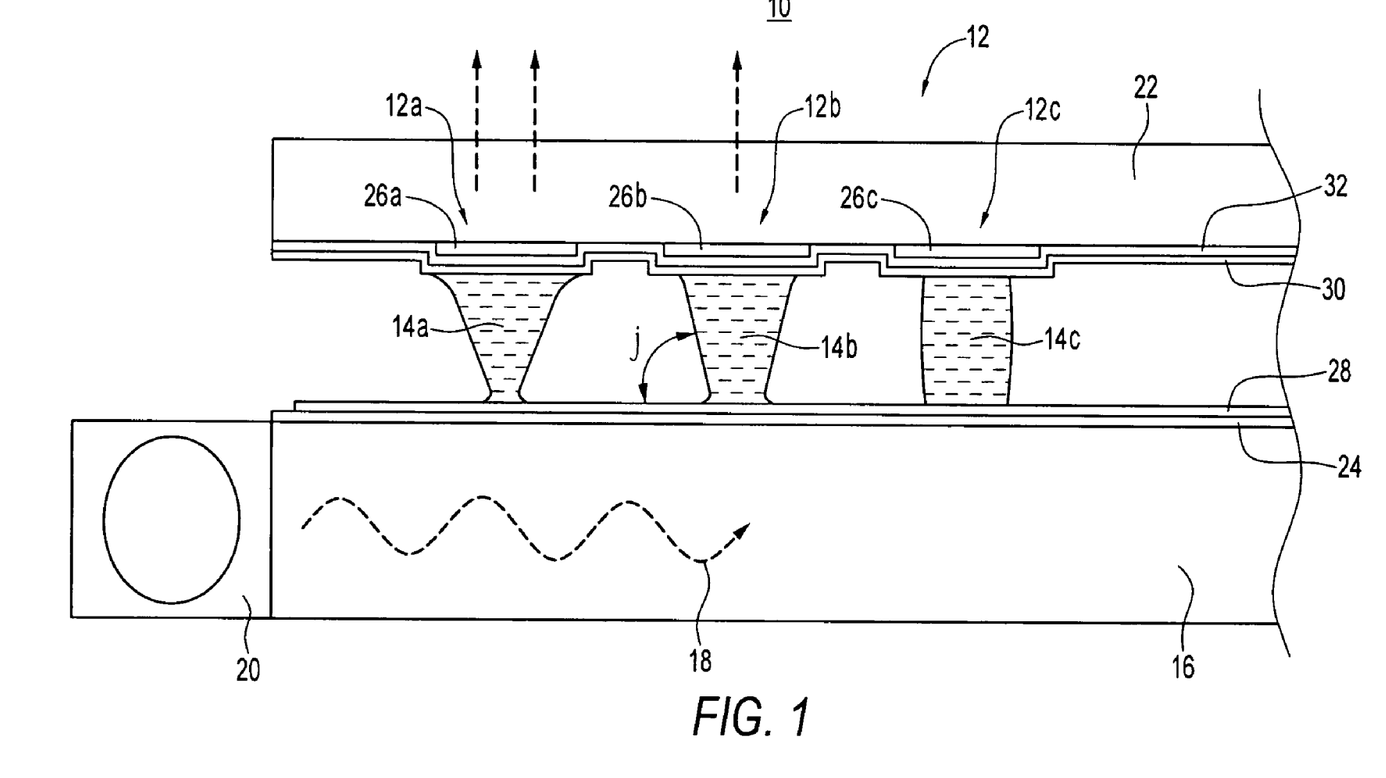
FIG. 1 is a schematic cross-section showing a pixel of a preferred embodiment display device of the invention.

FIG. 1 illustrates a portion of a preferred embodiment display device 10. FIG. 1 shows a single tri-color pixel 12 that includes separate sub pixels 12a, 12b and 12c. The separate sub pixels 12a, 12b and 12c have the ability to emit (or reflect) an individual primary color, e.g., red, blue and green. Additionally, the intensity of the emission by each of the separate sub pixels 12a, 12b and 12c can be individually controlled. Whether a display is produced and the intensity of a display from each of the sub pixels 12a, 12b and 12c is controlled by the shape of a corresponding light conducting fluid droplet 14a, 14b or 14c. The intensity of display and whether or not a display is produced depends upon the angle F that the fluid droplets make with respect to a substrate 16 that conducts light rays 18 from a light source 20. The shape of the droplets 14a, 14b and 14c is electrically controlled through the electrowetting effect.

Emissions from the sub pixels 12a, 12b and 12c exit the display device 10 through a cover 22. Color filters can be used, or in other embodiments, the fluid droplets 14a, 14b and 14c may also act as color filters in addition to providing the light conduction control that permits modulation of the display in a given pixel or sub-pixel. In the display device 10 shown in FIG. 1, the respective droplets 14a, 14b and 14c are respectively different primary colored fluids that act both as controlled waveguides that selectively conduct light between the substrate 16 and cover 22, and also as color filters that filter the light being conducted between the substrate 16 and the cover 22.

In the display device 10, the contact angle F of each droplet 14a, 14b and 14c is controlled by the potential between a common transparent electrode 24 and respective transparent electrode control lines 26a, 26b and 26c. Hydrophobic layers 28, 30 contact the fluid droplets 14a, 14b and 14c.

The fluid droplets 14a, 14b and 14c, along with the hydrophobic layers 28 and 30, are selected to have appropriate viscosity and surface tension properties such that the droplets redirect light into the substrate 16 when no voltage is applied between respective electrode control lines 26a, 26b or 26c and the common transparent electrode 24. This is the condition of the droplet 14c in FIG. 1, which exhibits the greatest angle F with respect to the substrate 16. The electrowetting effect is used to change the shape of particular individual fluid droplets and can therefore be used to modulate the amount of light emitted by each sub pixel 12a, 12b and 12c through the cover 22. Specifically, Snell's law can be used to show that most of the light conducted into the droplet when in the condition shown by the droplet of 14c will escape prior to reaching the cover 22. Accordingly, when the sub pixel 12c is viewed from above the cover 22, it will appear dark.

Application of a voltage between a respective transparent electrode control line 26a, 26b or 26c and the common transparent electrode 24 causes the angle F to decrease through the electrowetting effect. The reduction in the angle F between a droplet and the substrate 16 changes the shape of the droplet and makes it a better conductor of light to be seen from above the cover 22. The conduction of light is inversely proportional to the angle F, and accordingly increases as the voltage and angle F increase.

Voltage can be varied between no voltage and a maximum voltage to vary the intensity of light displayed by each sub pixel 12a, 12b and 12c as seen from the top of the cover 22. The pixel 12 is easily replicated in a large format array, as artisans will appreciate. Accordingly, the structure of the display device and of FIG. 1 can be used for a wide variety of display device applications.

The hydrophobic layers 28 and 30 and the fluid properties of the droplets 14a, 14b, 14c can be adjusted to have no display in a no voltage condition or to have a display in a no voltage condition. The display device 10 of FIG. 1 has the surface tension balanced in a no voltage condition such that under the no voltage condition, the droplet has the shape of the droplet 14c. When a voltage is applied between one or more of the transparent electrode control lines 26a, 26b, 26c in the common transparent electrode 24, charge accumulates at the droplet-dielectric layer. The dielectric layer 32 insulates the transparent electrode control lines 26a, 26b and 26c from the accumulated charge.

The hydrophobic layers 28 and 30 are not thick enough to provide electrical insulation in the FIG. 1 embodiment. The fluid droplets 14a, 14b, 14c therefore make electrical contact with the common electrode 24, and the dielectric layer 32 electrically insulates the transparent electrode control lines 26a, 26b, 26c from the fluid droplets 14a, 14b, 14c to enable use of the electrowetting effect. In an alternate embodiment, the hydrophobic layer 30 is made thick enough to act as a dielectric, in which case the separate dielectric layer 32 can be omitted.

With respect to each droplet, the volume of fluid is constant, and the application of voltage causes a droplet to spread out more at the hydrophobic layer 30 associated with the cover 22, which pulls fluid away and decreases the angle that the droplet makes with the substrate 16. At maximum voltage, a droplet makes the smallest possible contact, as represented by the droplet 14a in FIG. 1.

The substrate 16 has a higher index of refraction than surrounding environment, so a portion of light generated by the light source 20 is confined within the substrate 16 by total internal reflection. When droplets 14a, 14b and 14c having a refraction index higher than the surrounding environment optically contact the substrate 16, the droplet acts as a conductor of light from the substrate 16 to the cover 22, and the amount of light conducted depends upon the droplet shape.

In the path of light from the substrate 16 through the waveguide droplets 14a, 14b, 14c and out the cover 22, there is no substantial reduction of brightness as is inherent to the polarization that is required in LCD displays. The front emitting nature of the display 10 of FIG. 1 can also provide a wide viewing angle, the display has a relatively low part count that can contribute to a low manufacturing cost, can be fabricated into very large and very small arrays, and will have many other advantages that will be recognized by artisans.

Artisans will also recognize that various materials can be used to fabricate the display device 10 of FIG. 1. As an example, electrodes may be formed of indium tin oxide (ITO), a widely used transparent conductor, and the hydrophobic layers can be a material such as Teflon®. The substrate 16 and cover 22 can be formed of glass, and a cold cathode fluorescent lamp is a suitable as the light source 20. Many types of ionic fluids may be used to form droplets 14a, 14b, 14c, and examples include water, ethylene and glycol. Dyes can be used to color fluids, or separate color filters can be used.

Figure 2:
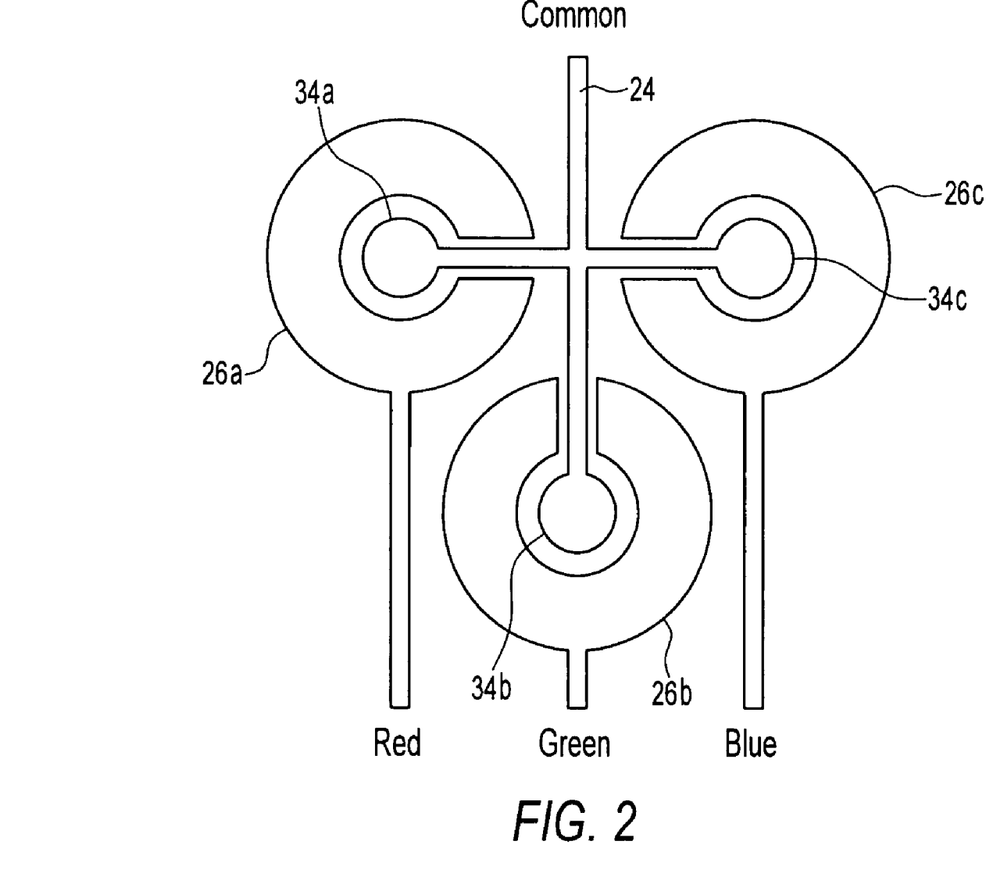
FIG. 2 shows a common plane electrode configuration for a modified embodiment display otherwise consistent with the display device of FIG. 1.

FIG. 2 illustrates an electrode configuration that can be used to modify the display device 10 of FIG. 1 to consolidate the common transparent electrode 24 and the transparent electrode control lines 26a, 26b and 26c onto the top cover 22. In such a modified embodiment, the substrate 16 need only be coated with the hydrophobic layer 28. In FIG. 2, the reference numbers from FIG. 1 used to label the transparent electrode control lines and the common transparent electrode are labeled with the same numbers in FIG. 2 although they have the configuration as shown in FIG. 2. The fluid droplets 14a, 14b, 14c, when used with an electrode configuration as shown in FIG. 2, will be aligned under circular electrode terminals 34a, 34b and 34c that are formed at terminal end points of the common electrode 24. The dielectric layer 32 (see FIG. 1) under the circular electrode terminals 34a, 34b and 34c is removed to permit fluid droplets to make electrical contact with the circular electrode terminals 34a, 34b and 34c. The droplets are positioned directly under the circular electrode terminals 34a, 34b and 34c. Application of a voltage potential between the control lines 26a, 26b, 26c and the common electrode causes the fluid droplets to change shape in the same manner as in FIG. 1 when the electrode configuration of claim 2 is used.

With the display device 10 of FIG. 1 and the modified embodiment realized with the electrode configuration shown in FIG. 2, maintaining a display requires the maintenance of a voltage between the common transparent electrode control lines without application of voltage. When no voltage is applied, the fluid droplets return to the state of the fluid droplet 14c as shown in FIG. 1, in which the sub pixel appears dark, when viewed from the top cover 22. The fluid may be selected such that the relaxation time is long, or alternatively, if the circuit capacitance is fairly high, a refresh voltage rate can occur during regular frame updates. If the decay rate of the fluid droplet shape is too quick given the refresh rate and other properties of the display, active thin film transistors can be used in a comparable manner to LCD displays to maintain the voltage between the common electrode 24 and the transparent electrodes 26a, 26b, 26c. An alternative embodiment is a persistent display in which the display is maintained despite the absence of a potential difference between common electrodes and electrode control lines 26a, 26b, 26c.

Figure 3:
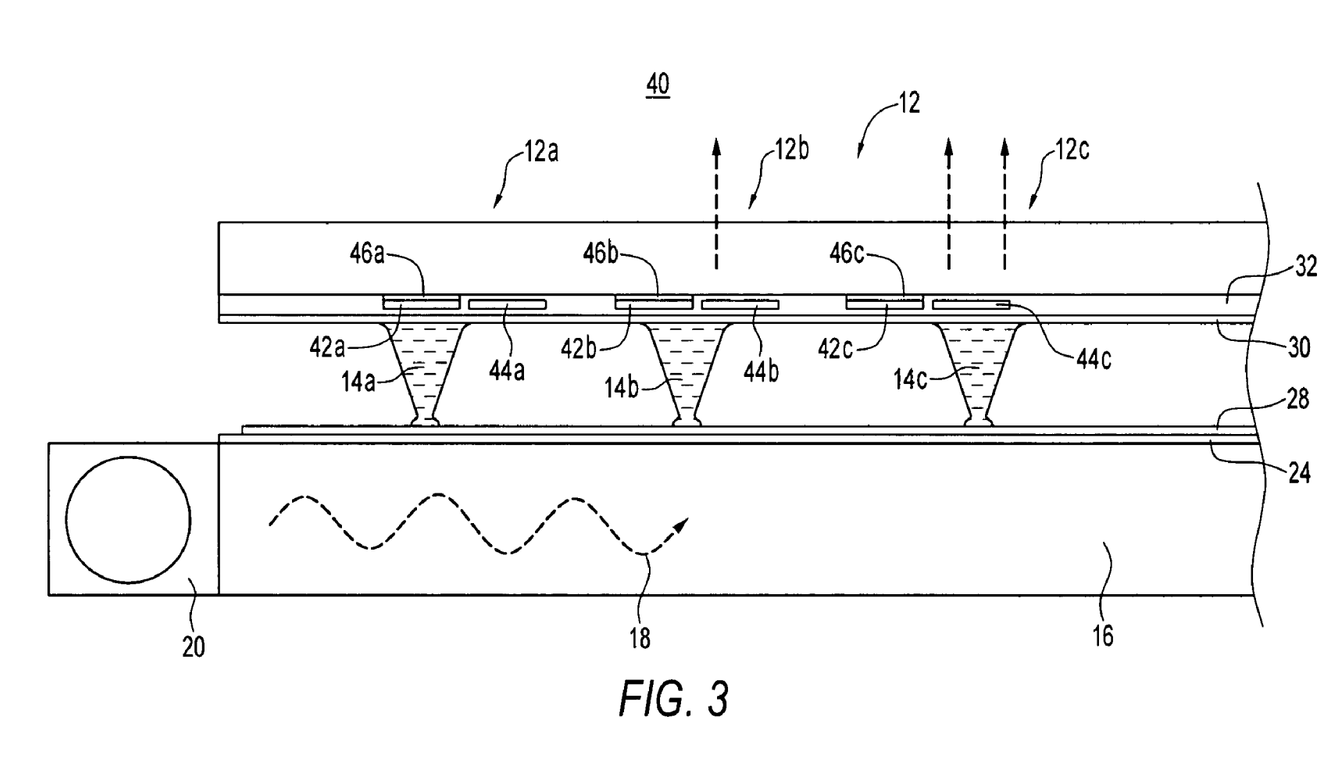
FIG. 3 is a schematic cross-section showing a pixel of another preferred embodiment display device of the invention.

FIG. 3 shows a persistent display device 40 in accordance with another embodiment of the invention. The display device 40 of FIG. 3 uses like reference numerals to label parts that are comparable to those shown in the display device 10 of FIG. 1. In the display device 40 of FIG. 3, both the shape and position of fluid droplet 14a, 14b and 14c are used to modulate the display of a given pixel or sub pixel. Each sub pixel 12a, 12b and 12c includes a pair of dual electrode control lines 42n, 44n. At least one of the control lines in each of the sub pixels is transparent, and in FIG. 3, both are shown as transparent and the control lines 42a, 42b and 42c include a black mask 46a, 46b, 46c, disposed between them and the cover 22. The properties of the fluid droplets 14a, 14b and 14c and the hydrophobic layers 30 and 28 in the display device 40 of FIG. 3 are set to control the shape of the droplets such that the droplets 14a, 14b, 14c are permanently shaped to conduct the maximum amount of light to be seen from above the cover 22.

One way of accomplishing this is to make the hydrophobic layer 30 less hydrophobic than the hydrophobic layer 28. Application of a potential between one of the dual electrodes 42n, 44n with respect to the common electrode 24 moves the droplet toward one of the electrodes 42n, 44n. In FIG. 3, each of the droplets 14a, 14b and 14c is shown in a different location. The droplet 14a conducts the same amount of light as the other droplets towards the cover 22, but has its light output masked by the black mask 46a. The droplet 14b has only a part of it output to the cover 22 blocked by the black mask 46b, and the droplet 14c has none of its output blocked by the black mask 46c. Once a droplet has been positioned, the display in the respective pixel or sub-pixel is persistent without further application of voltage. A voltage pulse to effect the display of a particular sub pixel need only be sent when the display is to be changed from a current state.

Figure 4:
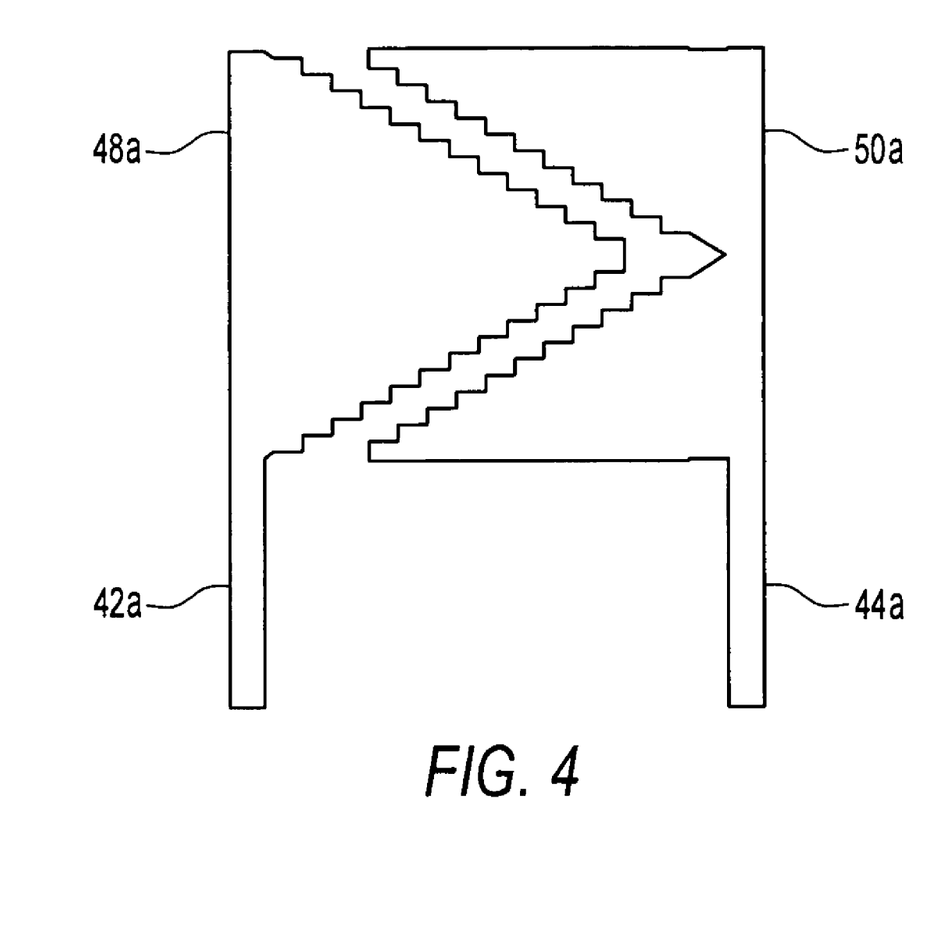
FIG. 4 shows a preferred electrode configuration for the display device of FIG. 3.

In the display of FIG. 3, the incremental movement of the shaped fluid conducting droplets 14a, 14b and 14c modulates the amount of light emitted from each sub pixel 12a, 12b and 12c. FIG. 4 shows an electrode control line pair configuration, in which control lines 42a and 44a include jagged interlocking terminals 48a and 50a. The incremental movement of fluid droplets can be more precisely controlled with the terminals 48a, 50a shown in FIG. 4, which can be used to produce a higher resolution display device.

A variation of the FIGS. 1 and 3 embodiments uses a single fluid droplet to produce all three primary colors sequentially. Such a variation can be employed if the shape and/or condition can be changed rapidly compared to the frame rate. One way to achieve such a variation of the FIGS. 1 and 3 embodiments is to change the color of the light from the light source 20 sequentially such that there are sequential primary color phases, e.g., red, green, blue phases. In that case, a tri-color pixel may be realized with a single pixel that has its level of light conduction changed in either or both of the manners illustrated with respect to the devices 10 or 40 in FIGS. 1 and 3. The sequential color control would be similar to the micro mirrored style projection displays.

Figure 5:
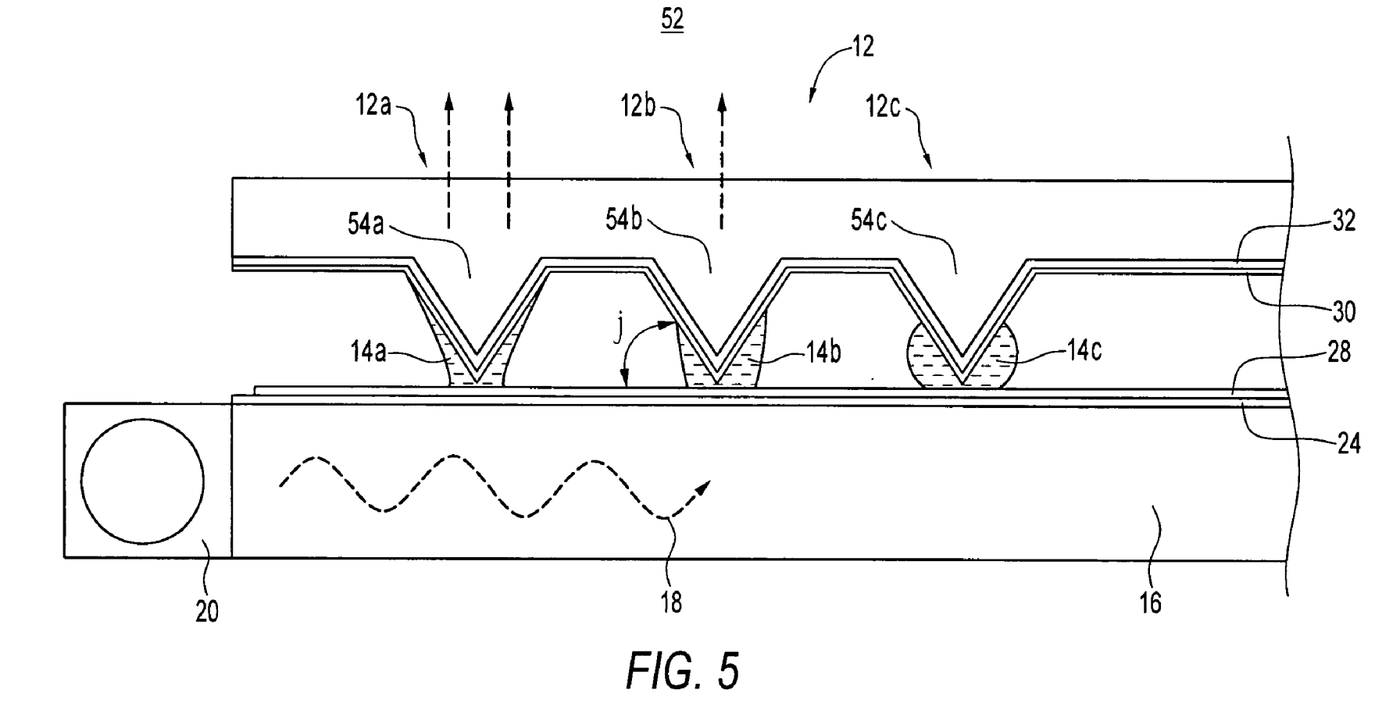
FIG. 5 is a schematic cross-section showing a pixel of another preferred embodiment display device of the invention.

FIG. 5 shows another embodiment display device 52 that shows the cover 22 modified to include cone structures 54a, 54b and 54c. The cone structures 54a, 54b and 54c are an example of a structure that can be formed in the cover or the substrate 16 to enhance fluid droplet shape and position control resolution as a function of applied voltage. Other parts of the display device 52 that are similar to parts shown in the display device 10 of FIG. 1 are labeled with like reference numbers. In the display device 52 of FIG. 5, application of a voltage in a particular sub pixel 12a, 12b and 12c causes a respective droplet 14a, 14b or 14c to stretch and cover its respective cone 54a, 54b, 54c. The maximum conductive state for the fluid droplet waveguide is illustrated by the droplet 14a. A lack of applied voltage results in the shape of the fluid droplet 14c, which is repelled by the hydrophobic layer 30 on the cone 54c, which will cause the pixel 12c to appear dark. The shaped structures 54a, 54b and 54c provide more surface contact area with respect to the hydrophobic layer 30, and therefore provide potentially finer control over the intensity of each of the sub-pixels 12a, 12b and 12c.

Figure 6:
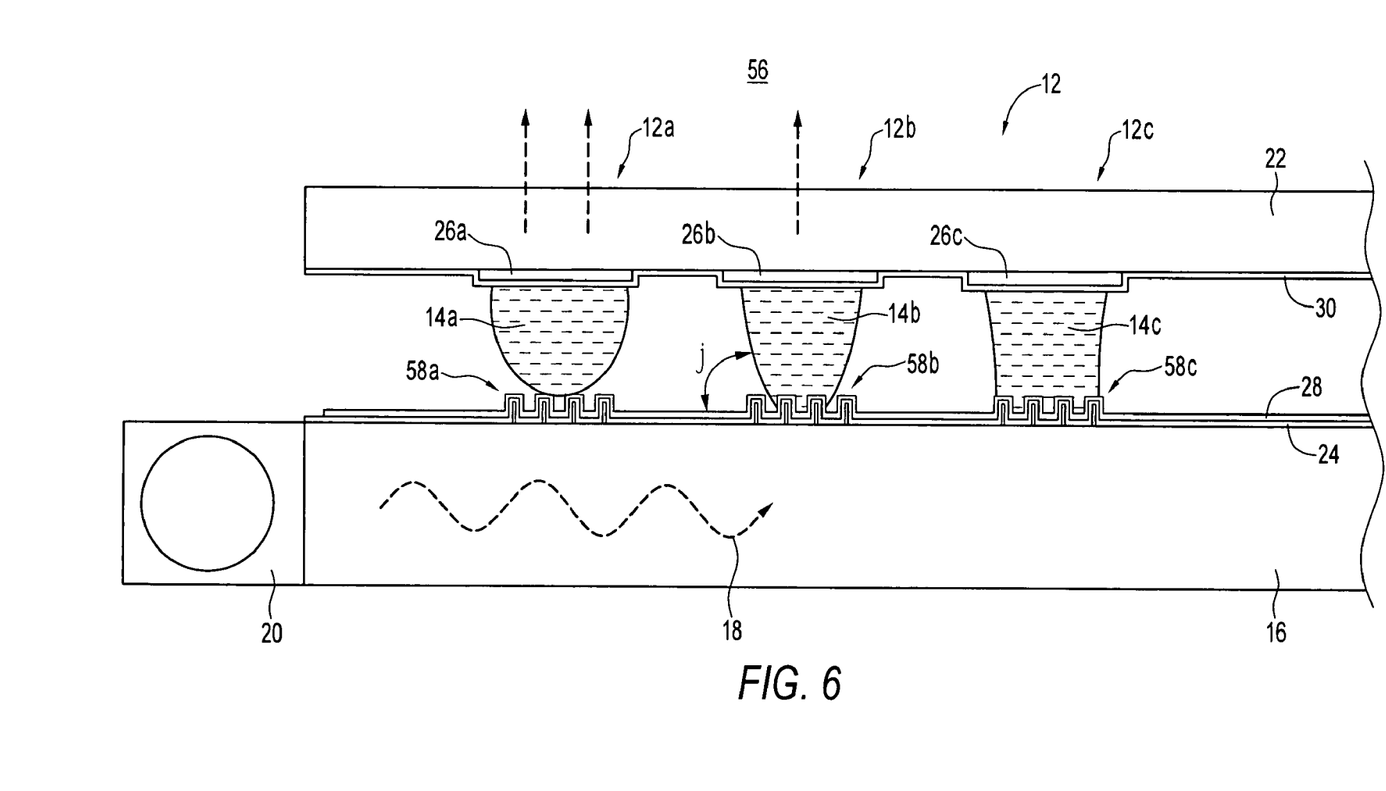
FIG. 6 is a schematic cross-section showing a pixel of another preferred embodiment display device of the invention

Structures can also be introduced into the substrate 16, as illustrated by the display device 56 shown in FIG. 6. Small structures can be etched around into the substrate 16 or the cover 22. In FIG. 6, scattering structures 58a, 58b and 58c formed on the substrate 16. The scattering structures 58a, 58b and 58c scatter light in the substrate 16 that would otherwise be trapped through internal reflection. The scattering structures 58a, 58b and 58c can be designed such that most of the scattered light is visible through the cover 22. With respect to an individual sub pixel, no voltage causes a fluid droplet to be repelled from a respective scattering structure, as illustrated by the droplet 14a and the scattering structure 58a. In this case, maximum light is visible for the sub pixel 12a. Increasing the voltage potential in a particular sub pixel to the maximum state illustrated for the sub pixel 12c causes the droplet 14c to fill the scattering structure 58c. In that state, the scattering structure 58c becomes indistinguishable from the fluid 14c and no light is scattered by the scattering structure 58c to create a dark pixel. The intensity of the sub pixels is modulated by the extent of the fluid that holds the scattering structures in the FIG. 6 embodiment.

Artisans will recognize many other variations consistent with the shape and, in some embodiments, position control of the exemplary display devices illustrated by the preferred embodiments. Artisans will recognize that standard micro fabrication and circuitry fabrication techniques can be used to form display devices of the invention. Fluid droplets may be positioned in a number of ways, including, for example, by ink jet printing techniques or by dipping patterned hydrophobic layers into solution. For example, the hydrophobic layers can be lithographically patterned with photoresist and developed. The unprotected hydrophobic material can be etched away either chemically or via plasma etching. Once the photoresist is removed, the hydrophobic layer will resemble the original lithographic mask, with precise areas covered by hydrophobic material. When dipped into a solution, areas without hydrophobic material will attract the solution and areas with hydrophobic material will repel the solution. This method allows droplets to assemble in precise locations across a large area quickly.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

The invention claimed is:

1. A light conductive controlled shape droplet display device, the device comprising:
    a light source;
    a light conductive substrate receiving and conducting light from said light source;
    a cover disposed relative to said light conductive substrate, said cover conducting light received from said light conductive substrate out and away from said display device; and
    a plurality of pixels, each pixel being defined by
        a fluid droplet in optical communication with said light conductive substrate and said cover;
        at least one hydrophobic layer associated with said light conductive substrate or said cover for controlling the shape of said fluid droplet, properties of said fluid droplet and said at least one hydrophobic layer being set to shape said fluid droplet to conduct a predetermined amount of light through said fluid droplet and into said cover under a condition of no voltage potential applied to said fluid droplet; and
        electrodes arranged to modulate the amount of light conducted by said fluid droplet from said light conductive substrate into said cover by application of a voltage potential to said fluid droplet.

2. The display device of claim 1, wherein:
    each of said plurality of pixels comprises a plurality of sub-pixels, each sub-pixel having a fluid droplet for modulating the amount of light conducted from said light conductive substrate into said cover; and
    sub-pixels in each of said plurality of pixels have different primary colored fluid droplets.

3. The display device of claim 1, wherein properties of said fluid droplet and said at least one hydrophobic layer are set to shape said fluid droplet to conduct a maximum amount of light through said fluid droplet and into said cover under a condition of no voltage potential applied to said fluid droplet.

4. The display device of claim 1, wherein properties of said fluid droplet and said at least one hydrophobic layer are set to shape said fluid droplet to conduct a minimum amount of light through said fluid droplet and into said cover under a condition of no voltage potential applied to said fluid droplet.

5. The display device of claim 1, wherein said electrodes comprise a common electrode and an electrode control line.

6. The display device of claim 5, wherein said common electrode and said electrode control line are commonly arranged on said cover.

7. The display device of claim 6, wherein said electrode control line comprises a pair of electrodes, arranged to move said fluid droplet with respect to a mask to modulate the amount of light conducted through said fluid droplet and into said cover.

8. The display device of claim 7, wherein said pair of electrodes comprise jagged interlocking terminals.

9. The display device of claim 1, further comprising shaped structure means for enhancing fluid droplet shape control.

10. The display device of claim 1, further comprising scattering means associated with said fluid droplet for modulating the amount of light conducted through fluid droplet and into said cover depending on the amount of contact between said fluid droplet and said waveguide means.

11. The display according to claim 1, wherein said electrodes are arranged to change a contact angle that said fluid droplet makes with respect to said substrate to modulate the amount of light conducted through said fluid droplet and into said cover.

12. The display according to claim 1, wherein said electrodes are arranged to change a position of said fluid droplet with respect to a mask to modulate the amount of light conducted through said fluid droplet and into said cover.

13. The display according to claim 1, wherein at least one of said electrodes is transparent to pass light conducted through said fluid droplet into said cover.

14. The display according to claim 1, comprising first and second hydrophobic layers respectively associated with each of said light conductive substrate and said cover for controlling the shape of said fluid droplet, wherein said fluid droplet extends between said first and second hydrophobic layers and properties of said fluid droplet and said first and second hydrophobic layers being set to shape said fluid droplet to conduct a predetermined amount of light through said fluid droplet and into said cover under a condition of no voltage potential applied to said fluid droplet.

15. The display according to claim 1, wherein one of the first and second hydrophobic layers is less hydrophobic than the other of said first and second hydrophobic layers.

* * * * *

UNITED STATES PATENT AND TRADEMARK OFFICE
CERTIFICATE OF CORRECTION

Page 1 of 1

PATENT NO. : 7,826,125 B2
APPLICATION NO. : 11/451055
DATED : November 2, 2010
INVENTOR(S) : Psaltis et al.

It is certified that error appears in the above-identified patent and that said Letters Patent is hereby corrected as shown below:

In the Specification:

Col. 1, Line 39    Delete "sub sub-pixel" and insert --sub-pixel-- in its place.

Signed and Sealed this
Twenty-sixth Day of April, 2011

David J. Kappos
*Director of the United States Patent and Trademark Office*